(12) United States Patent
Keber et al.

(10) Patent No.: US 9,416,888 B2
(45) Date of Patent: Aug. 16, 2016

(54) GAS REGULATING UNIT OF MODULAR CONSTRUCTION AND GAS REGULATING VALVE

(71) Applicant: ebm-papst Landshut GmbH, Landshut (DE)

(72) Inventors: Roland Keber, Wörth a. d. Isar (DE); Hans-Joachim Klink, Erolzheim (DE); Enno Vrolijk, Dalen (NL)

(*) Notice: Subject to any disclaimer, the term of this patent is extended or adjusted under 35 U.S.C. 154(b) by 17 days.

(21) Appl. No.: 14/387,784

(22) PCT Filed: Feb. 27, 2013

(86) PCT No.: PCT/EP2013/053926
§ 371 (c)(1),
(2) Date: Sep. 24, 2014

(87) PCT Pub. No.: WO2013/143799
PCT Pub. Date: Oct. 3, 2013

(65) Prior Publication Data
US 2015/0053287 A1 Feb. 26, 2015

(30) Foreign Application Priority Data
Mar. 27, 2012 (DE) .................. 10 2012 102 645

(51) Int. Cl.
| F16K 27/00 | (2006.01) |
| F16K 39/00 | (2006.01) |
| F16K 31/04 | (2006.01) |
| F16K 27/02 | (2006.01) |
| F23N 1/00 | (2006.01) |

(52) U.S. Cl.
CPC .............. *F16K 27/00* (2013.01); *F16K 27/029* (2013.01); *F16K 31/04* (2013.01); *F16K 39/00* (2013.01); *F23N 1/005* (2013.01); *F23N 2035/02* (2013.01); *F23N 2035/14* (2013.01); *F23N2035/18* (2013.01); *F23N 2035/24* (2013.01); *Y10T 137/87917* (2015.04)

(58) Field of Classification Search
CPC ......... F16K 27/00; F16K 31/04; F16K 39/00; F23N 1/005
USPC .......... 137/613, 454.5, 454.6, 884; 251/335.2
See application file for complete search history.

(56) References Cited

U.S. PATENT DOCUMENTS 4,706,929 A * 11/1987 Kalaskie ................. F16K 1/305
137/316
5,125,622 A * 6/1992 Kalaskie ................. F16K 41/12
251/335.2

(Continued)

FOREIGN PATENT DOCUMENTS

| DE | 19534285 A1 | 3/1997 |
| EP | 0834695 A1 | 4/1998 |
| EP | 2048439 A1 | 4/2009 |

OTHER PUBLICATIONS

International Preliminary Report on Patentability (in German with English Translation) for PCT/EP2013/053926, issued Oct. 1, 2014; ISA/EP.

(Continued)

*Primary Examiner* — Kevin Lee
(74) *Attorney, Agent, or Firm* — Harness, Dickey & Pierce, P.L.C.

(57) ABSTRACT

The invention relates to a gas regulating unit of modular construction, in particular for regulating the amount of gas to be supplied to a gas burner, and to a gas regulating valve which, as a whole, is in the form of a module and which can be used in an aforementioned gas regulating unit of modular construction.

17 Claims, 5 Drawing Sheets

(56) References Cited

U.S. PATENT DOCUMENTS

| | | |
|---|---|---|
| 5,642,756 A | 7/1997 | Lawrence et al. |
| 2007/0205384 A1 | 9/2007 | Kurosawa |
| 2012/0012768 A1* | 1/2012 | Yahr .................. F16K 1/02 251/129.11 |

OTHER PUBLICATIONS

International Search Report (in German with English Translation) for PCT/EP2013/053926, mailed May 21, 2013; ISA/JP.

Written Opinion for PCT/EP2013/053926, mailed Jun. 21, 2013; ISA/EP.

* cited by examiner

GAS REGULATING UNIT OF MODULAR CONSTRUCTION AND GAS REGULATING VALVE

CROSS REFERENCE TO RELATED APPLICATIONS

This application is a U.S. National Phase Application under 35 U.S.C. 371 of International Application No. PCT/EP2013/053926 filed on Feb. 27, 2013 and published as WO 2013/143799 A1 on Oct. 3, 2013. This application is based on and claims the benefit of priority from German Patent Application No. 102012102645.9 filed on Mar. 27, 2012. The entire disclosures of all of the above applications are incorporated herein by reference.

TECHNICAL FIELD OF THE INVENTION

The invention relates to a gas regulation unit constructed in a modular manner, in particular for regulating the amount of gas to be supplied to a gas burner, and to a gas regulation valve which is formed in its entirety as a module and can be used in a modular gas regulation unit of this type.

BACKGROUND OF THE INVENTION

Various gas regulation valves and gas safety valves for use in gas/air mixing units, and in particular in gas burners, are known from the prior art. The European patent application EP 0 834 695 A1 discloses a mixing device for gas burners, in the housings of which are arranged closure elements which are operated electromagnetically, in order to open and close a gas flow to a valve seat. In this case, the valve seat itself is formed by the housing or portions of the mixing device that are formed integrally therewith. The flat valves used in this prior art are not suitable for regulating the amount of gas, since they can substantially only be set to the positions "on" and "off". By using parts of the housing of the mixing device as the valve seat, said housing has to be formed to have a special surface at least in this region in order to be able to ensure sealing. This typically necessitates complex finishing on the valve seat once the housing has been produced.

EP 2 048 439 A1 further discloses integrating a gas regulator having a valve body into a radial fan housing, and to arrange the valve seat of the entire regulator directly on a housing part located in the interior.

All the known solutions have the disadvantage, however, that the gas regulation valves or gas safety valves have to be specially tailored to a particular housing shape of the mixing device or of the fan and can only be used for this product in each case.

Proceeding from this problem, the object of the invention is to provide a gas regulation unit and a gas regulation valve which can be used therein, both of which can be used in various housing types, in particular of mixing devices or fans. Furthermore, the object of the invention is to reduce the assembly time of the appropriate units for the gas regulation and to shorten the function and air-tightness tests to be carried out.

SUMMARY OF THE INVENTION

A gas regulation valve according to the invention comprises a housing having a gas inlet, a valve body which is held in the housing and arranged so as to be movable in a first and second axial direction, a valve seat, at least one first spring which acts on the valve body in the first axial direction, a shaft which is movable in the axial direction and indirectly or directly engages with the valve body, a drive which acts on the shaft and moves said shaft and thus the valve body in predefined longitudinal portions in the axial direction for opening and closing the gas regulation valve, the gas regulation valve being formed in its entirety as a replaceable module. In this regard, the gas regulation valve does not have to fulfil any safety functions whatsoever.

"Replaceable module" should be understood to mean that the gas regulation valve is formed as a separate component part and can be combined with additional component parts. Owing to the configuration as a module, the gas regulation valve can be attached to any given components, provided for that purpose, and removed again via a suitable interface. The feature of a shaft which indirectly or directly engages with the valve body should be understood to mean any configuration which, in a gas regulation valve, acts upon the valve body such as to shift the position thereof in the axial direction, regardless of whether said shaft is provided as an additional component or is itself provided on a drive. The shaft is preferably metallic.

In a preferred embodiment, at least a part of the housing is formed as an insert cartridge, whereby the gas regulation valve formed as a module can be constructed to be compact and can be inserted or screwed into housings of fan devices or gas/air mixing devices. It is favourable in this case if a thread, a flange or a comparable releasable fastening means is provided on the outside of the housing formed as an insert cartridge. It is also advantageous that the components which determine the gas flow or the amount of gas are received in an insert cartridge of this type, and are thus located in the gas flow path when the cartridge is screwed in the corresponding housing. Here, the "insert cartridge" is defined as a housing part that is suitable for being inserted into another component, without the need to provide any further structural features on the other component aside from an appropriate shape adaptation.

By contrast to the pneumatic regulation of the amount of gas, as used in the prior art EP 0 834 695 A1, it is provided according to the invention to use an electronically actuated stepper motor as the drive of the gas regulation valve. Via the stepper motor and the shaft, which moves in the first axial direction, an increasing force is exerted on the valve body, which force counteracts the spring force of the first spring until the valve body releases from the valve seat and unblocks the gas flow.

In an advantageous embodiment, the gas regulation valve is formed to have a direct pressure regulator, the valve body being held in the centre by a membrane and the gas entering between the membrane and the valve seat in the axial direction, so that a gas pressure acts in the first axial direction against the membrane and in the second, opposite axial direction against the valve body or against portions of the valve body which extend radially outwards. The valve body is thus located in an equilibrium of forces, influenced in a first axial direction by the spring force of the first spring, the external pressure and the gas pressure against the membrane that holds the valve body and in a second axial direction by the gas pressure and the force of the drive on the valve body.

In the preferred embodiment of the stepper motor, this ensures that only a small lift of the drive is necessary to release the valve body from the valve seat in a predetermined manner in the second axial direction and to thus unblock a predefined amount of gas per unit of time. The configuration according to the invention of the direct pressure regulator having an equilibrium of forces allows for the provision of larger passage diameters of from 15-35 mm, preferably from 15-25 mm for the gas path, and therefore the required lift of the valve body from the valve seat is drastically reduced and does not exceed 3-8 mm, preferably 3-5 mm. In gas regulation valves according to the prior art, a lift of 10 mm is required. By lowering the necessary lift in the axial direction, the stepper motor generating this axial movement can be provided in a very simple and comparatively cost-effective configuration, and this leads to a significant reduction in the overall costs of the gas regulation valve constructed in a modular manner. The diameter of the housing and the size of the unblocked gas path of the gas regulation valve can also be given much greater dimensions than regulators known from the prior art, without impairing the regulation accuracy. As the outer diameter of the housing, according to the invention a size "c" of from 30-50 mm, preferably 30-40 mm, is preferred as the size of the unblocked gas path having a gap width "b" of from 2-5 mm.

The movement of the valve body in the second axial direction can further be regulated more accurately in that a second spring is arranged between the shaft and the valve body and acts upon the valve body in the second axial direction. When using a stepper motor, the predetermined opening positions of the valve body can then be electronically actuated via individual steps and half steps. To promote the compact construction, it is provided in a preferred embodiment that the second spring is arranged within the hollow valve body and extends along the shaft of the drive or stepper motor in the axial direction. In an advantageous embodiment according to the invention, the valve seat is formed by parts of the housing of the gas regulation valve, more particularly by parts of the insert cartridge, and therefore additional components within the modular gas regulation valve can be omitted as much as possible and thus the construction can be configured to be as small as possible, especially in the axial direction. In an advantageous embodiment, it is provided that portions extend in the radial direction from the housing of the gas regulation valve, which is formed as an insert cartridge, towards the centre and form the valve seat with their edge region that faces radially inwards.

The direct pressure regulator can be separated from the drive, more particularly the stepper motor, by a preferably metallic sealing plate, the sealing plate being arranged between the stepper motor and the membrane. A hole is provided in the central region of the sealing plate, through which hole the shaft extends and produces an indirect connection between the drive, more particularly the stepper motor, and the valve body. The sealing plate does not seal the direct pressure regulator completely, but rather only to the extent that is required by the standards (for example: DIN-EN 13611), a certain amount of gas (less than 70 liters/hour) being allowed to escape via the hole in the sealing plate in the event of a fault. An embodiment of the gas regulation valve having a sealing plate is favourable to the effect that the drive that is used, more particularly a stepper motor, does not itself have to be gas-tight and is thus significantly less expensive.

According to another aspect of the invention, the gas regulation valve described above is combined with a gas safety valve, which is likewise formed as a module, to form a gas regulation unit constructed in a modular manner, in particular for regulating the amount of gas to be supplied to a gas burner. In this case, the gas regulation valve formed as a module is arranged in a row with the gas safety valve formed as a module, such that the gas safety valve is upstream of the gas regulation valve when viewed in the flow direction.

By using two component parts which have each been formed as a module, the development time is reduced, since each module only has to be developed once, but can be used later in various end products, for example in ventilating fan housings, gas valve housings or gas/air manifolds. Furthermore, each of the modules can be produced and tested for their function separately, it being possible for the testing devices for the modular valves to be designed to be significantly smaller than those that had to be used in the prior art for the components as a whole, e.g. ventilating fan housings having safety valves arranged thereon and a gas regulation valve.

The modular construction also has the advantage that a plurality of the respective gas regulation valves and gas safety valves formed as modules can be attached in parallel to the respective end product and thus greater power and modulation ranges can be obtained in a simple and cost-effective manner.

In a preferred embodiment, only one gas safety valve is provided for the gas regulation unit and this safety valve is formed as a double safety valve. Account can thus be taken of the need for double sealing of components arranged in the gas path, without the space required therefor being too great, as would be the case when using two separate safety valves. It is also favourable in this case to form the gas safety valve as a coaxial valve, since this is particularly compact and the surface area required on the component on which the valves will eventually be arranged is smaller than in the solutions known from the prior art.

In addition to the gas regulation valve, it is preferable for the gas safety valve to also have a cartridge-like housing having means for being releasably fastened to a gas valve housing, a ventilating fan housing or a manifold. It is also provided in an advantageous embodiment that sealing means arranged in each case on the outside of the cartridge-like housing parts of the two modular valves are provided for sealing the modules on the gas valve housing, the ventilating fan housing or the manifold. Owing to the cartridge-like configuration of the respective housing, this can take place in the form of inexpensive sealing rings which are introduced in a sealing manner between the gas valve housing, the ventilating fan housing or the manifold and the respective module.

It is also favourable that no special requirements are necessary on the gas valve housing in terms of the nature of the material or surface, the ventilating fan housing or the manifold, since both securing against leakages and gas regulation are carried out exclusively by the modular gas safety valves and the gas regulation valve. The only provision that has to be made is of a receiving region which matches the modules or cartridge-like housings in each case and in which the respective module is inserted and releasably fastened. In a particularly simple embodiment, the modular valves and the gas valve housing, the ventilating fan housing or the manifold each comprise complementary threads. However, other fastening types such as flange threaded joints, clip connections or other solutions known in the prior art are also possible.

The size of a combined unit consisting of a gas valve housing, a ventilating fan housing or a manifold having the gas regulation valve formed as a module and the gas safety valve formed as a module is at least 20% smaller than corresponding units used up to this point, in which gas regulation valves and gas safety valves have been used that are not constructed in a modular manner. When using a double safety valve constructed in a coaxial manner, whereby there is no need for a second safety valve, the overall size is reduced by at least 40% by comparison with solutions known from the prior art.

BRIEF DESCRIPTION OF THE DRAWINGS

Other advantageous embodiments of the invention are characterised in the dependent claims, or are described in more detail below, together with the description of the preferred embodiment of the invention, with reference to the drawings, in which:

DESCRIPTION OF THE PREFERRED EMBODIMENTS

Figure 1:
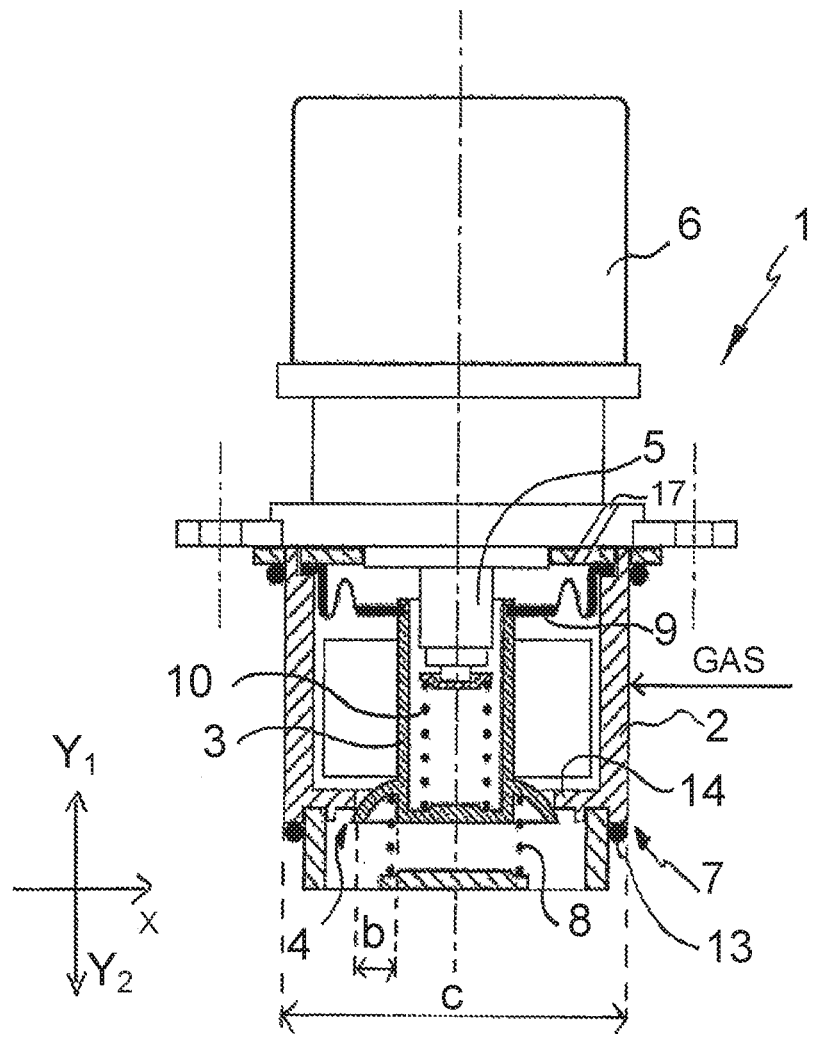
FIG. 1 is a sectional side view of a gas regulation valve having a gas-tight drive.

The figures show, schematically and by way of example, the components that are necessary for understanding the invention, same components being denoted by the same reference numerals in each case.

FIG. 1 shows a gas regulation valve 1 having a drive which is formed as a stepper motor 6 and arranged on a direct pressure regulator. The gas regulation valve 1 is formed in its entirety as a replaceable module, the housing 2 being the part of the module which is inserted into the respective end product (e.g. the gas valve housing, ventilating fan housing, or manifold) and fixed therein. For this purpose, the housing 2 is formed as a cartridge 7 which is arranged in the region of the gas flow during operation and receives the components that regulate the amount of gas per unit of time. A hollow valve body 3 is held in the cartridge-like housing 2 by a membrane 9, the membrane 9 being fastened to the housing 2 and forming a planar delimitation to the stepper motor 6. A compensation opening 17 allows for pressure compensation in the region above the membrane 9. The housing 2 has a portion 14 which extends towards the centre in the radial direction and forms the valve seat 4 for the valve body 3. A first spring 8 is arranged between the housing 2 and the valve body 3 and acts upon the valve body 3 in the first axial direction Y1, pushing said valve body against the valve seat 4. Gas enters the gas regulation valve 1 in the axial direction between the membrane 9 and the valve seat 4, and therefore the gas pressure acts in the first axial direction Y1 against the membrane 9 and in the second, opposite axial direction Y2 against the valve body 3 or against portions on the valve body 3 which extend outwards in the radial direction. The force of the gas pressure on the valve body 3 is thus applied in both axial directions Y1, Y2 and in total is substantially equal to zero. The stepper motor 6 has a shaft 5, via which a force can be indirectly applied to the valve body 3 in the second axial direction Y2, in order to move said valve body. In the embodiment shown, a second spring 10 is arranged in the valve body 3, which spring extends in the axial direction and upon which spring the shaft 5 of the stepper motor 6 acts in the second axial direction Y2, in order to release the valve body 3 from the valve seat 4. The force is applied by the stepper motor 6 via the second spring 10 against the force of the first spring 8 and the external pressure prevailing outside the gas regulation valve 1. The valve body 3 is located above the forces of the gas pressure and the spring forces in an equilibrium of forces, and therefore any axial movement of the shaft 5 in the second axial direction Y2 directly implies a corresponding lift of the valve body 3 from the valve seat 4. This equilibrium of forces makes it possible to design the diameter of the housing 2, the valve body 3 and the gas path unblocked by the valve body 3 (valve gap having opening width b) to be larger, so that the lift that is completely necessary in the axial direction of the valve body 3 from the valve seat can be limited to 3 mm. The housing 2 has an outer diameter of from 30-50 mm, the valve body has an outer diameter of from 15-25 mm and the circumferential valve gap, unblocked on the valve seat 4 for the gas path, has an opening width of from 3-5 mm.

Figure 2:
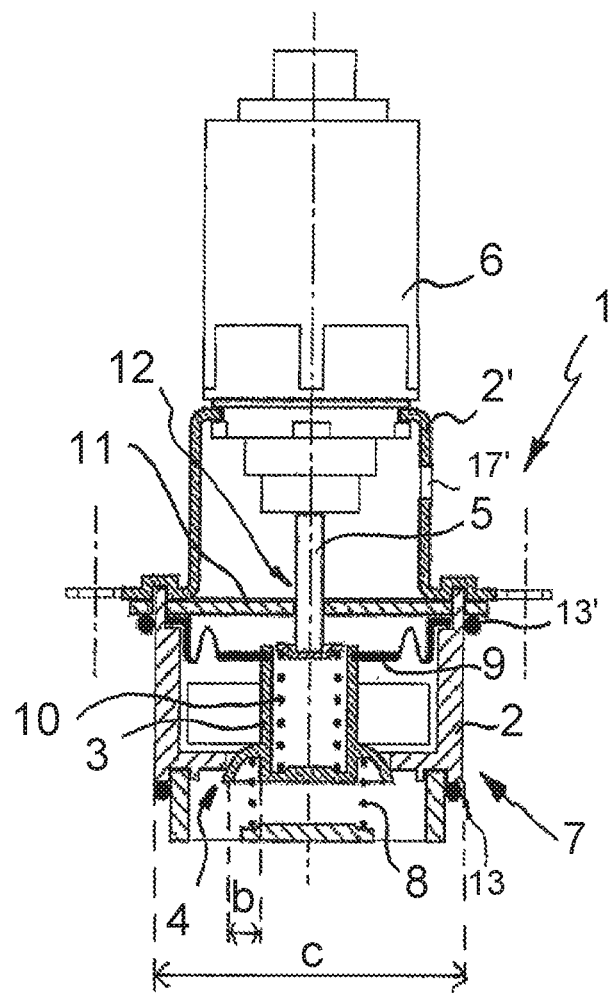
FIG. 2 is a sectional side view of a gas regulation valve having a non-gas-tight drive.

FIG. 2 shows the gas regulation valve 1 having a direct pressure regulator which is identical to that in FIG. 1 and comprises the housing 2 as a cartridge 7, the valve body 3, the valve seat 4, the springs 8 and 10 and the membrane 9 arranged on the valve seat 4. By contrast to the embodiment according to FIG. 1, a non-gas-tight stepper motor 6 is used, which is fastened to the housing 2 of the gas regulation valve 1 via an upper housing 2', the stepper motor 6 acting indirectly on the valve body 3 via the shaft 5 and the shaft 5 serving as an extension rod between the valve body 3 and the stepper motor 6. A sealing plate 11 is arranged between the stepper motor 6 and the membrane 3 and has a hole 12 in the central centre region, through which hole the shaft 5 extends. A certain amount of gas can escape via the hole 12. However, this is such a small amount that the relevant international standards are still complied with. The sealing plate 11 is inserted into the housing 2 and fastened to the housing 2 via the upper housing 2' which holds the stepper motor 6. The present construction allows for the use of a non-gas-tight stepper motor 6, which is approximately 30% cheaper than a gas-tight stepper motor. Sealing means 13, 13' are provided on the housing 2 formed as an insert cartridge 7 and prevent gas from escaping to the exterior past the gas regulation valve 1. The upper housing 2' has external bores, through which screws (not shown) can be fixed in position for fixing the gas regulation valve 1 to another component. In an alternative embodiment (not shown), the upper housing 2' is moulded as a simple bracket, but still carries out the same functions. A compensation opening 17' is provided in the upper housing 2' for pressure compensation.

Figure 3:
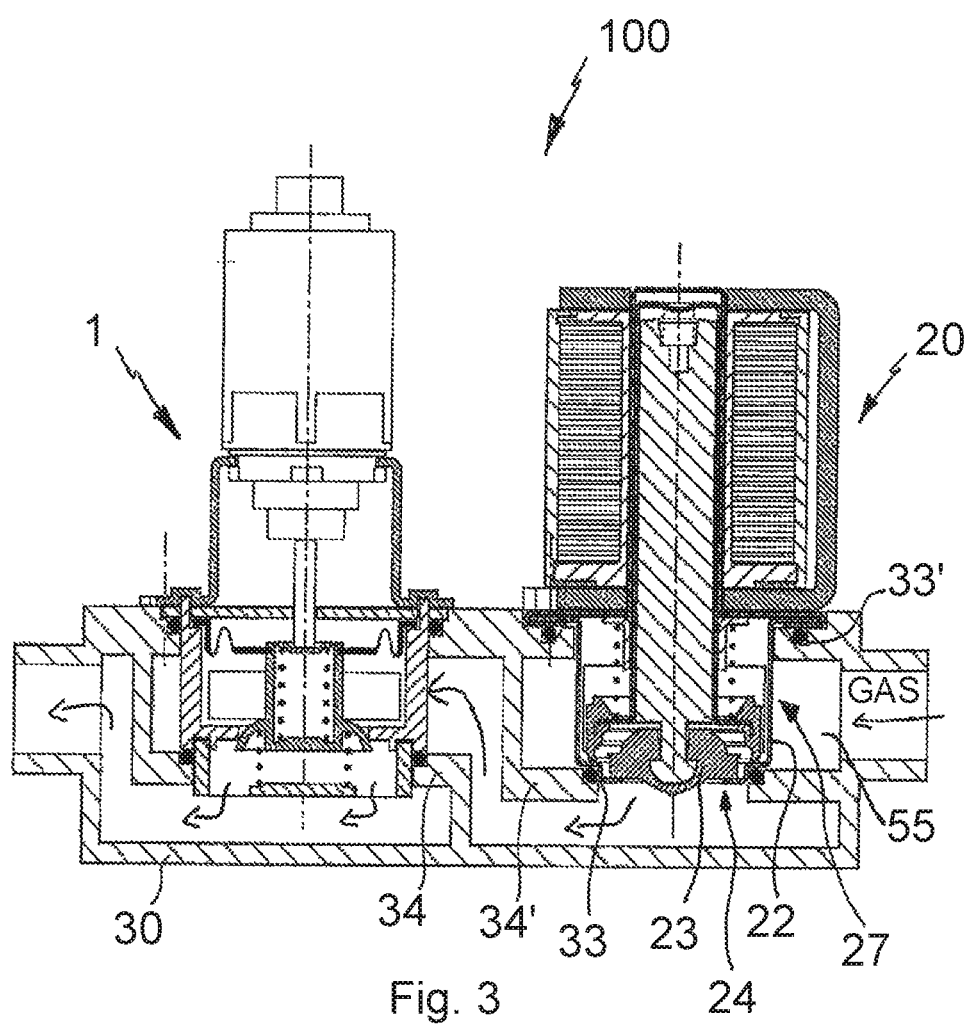
FIG. 3 shows a gas regulation unit having a gas regulation valve with a coaxial double safety valve.

FIG. 3 shows a gas regulation unit 100 for regulating the amount of gas to be supplied to a gas burner, the gas valve 1, formed as a module, of FIG. 2 and a gas safety valve 20 formed as a module being arranged in a row, the gas safety valve 20 being located upstream of the gas regulation valve 1 when viewed in the flow direction. Both the gas regulation valve 1 and the gas safety valve 20 are releasably fasted in a gas valve housing 30. Unlike the solutions known from the prior art, both valves 1 and 20 are formed as modules, and therefore they do not make any requirements on the gas valve housing 30 besides the fastening means which are to be provided for fastening. Only the space 55 has to meet increased requirements. The gas safety valve 20 is formed as a coaxial double safety valve, and therefore just one gas safety valve 20 is sufficient to ensure the protection against the escape of gas that is required by law. The gas safety valve 20 also has an insert cartridge 27 which is arranged in the gas valve 30 and is formed by the lower portion of the housing 22. The manner in which gas safety valves 20 of this type are electronically operated in order to release the valve body 23 from the valve seat 24 and to ensure the double protection via the springs is known from the prior art. The use according to the invention of an insert cartridge 27 on the gas safety valve 20 allows said valve to be inserted into the gas valve housing 30 in a modular manner and to be fastened thereto. As fastening means, it can also be provided to attach additional screws or to provide interlocking threads directly on the insert cartridge 27 and the gas valve housing 30. The insert cartridge 27 is also doubly sealed on the gas valve housing 30 via sealing means 33 and 33'. The gas thus enters the insert cartridge 27 laterally from the right (as shown by the arrow) and, if the valve body 23 has been released from the valve seat 24, is pushed towards the gas regulation valve 1 owing to the provided gas pressure, passing through said gas regulation valve to the gas outlet via the valve seat. In order to define the gas path, the gas valve housing 30 has corresponding webs 34, 34' which receive the modules and are abutted by the insert cartridges 7 and 27 in a sealing manner in each case.

Figure 4:
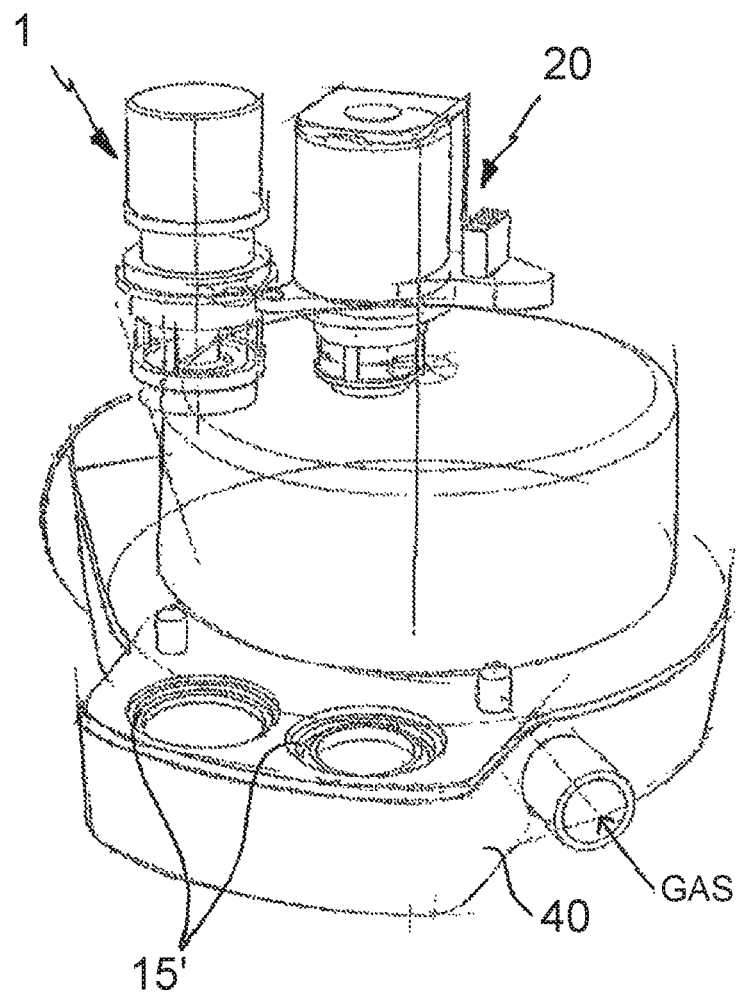
FIG. 4 is a perspective view of a ventilating fan having an insertable, modular gas regulation valve and a gas safety valve.

FIG. 4 is a perspective schematic view of a ventilating fan housing 40 on which fastening means 15' are provided in the form of threads, into which the gas regulation valve 1 and the gas safety valve 20 can be screwed.

Figure 5:
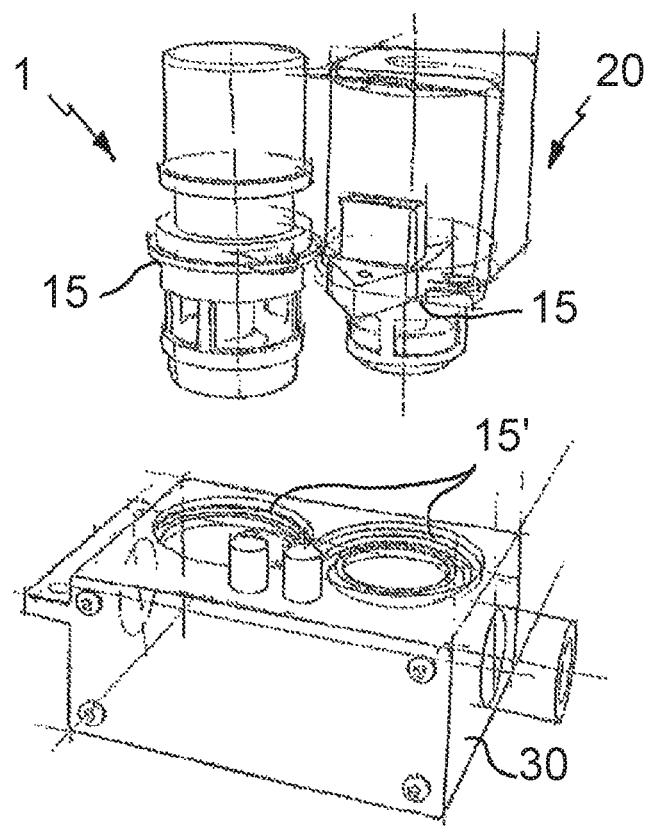
FIG. 5 is a perspective view of a gas valve housing having an insertable, modular gas regulation valve and a gas safety valve.

FIG. 5 is a perspective view of a gas regulation valve housing 30 comprising modules of a gas regulation valve 1 and gas safety valve 20, which are provided for fastening on top, the gas regulation valve 1 and the gas safety valve 20 being provided with threads 15 which can be screwed into the corresponding thread 15' on the gas valve housing 30.

The invention claimed is:

1. A gas regulation valve comprising
    a housing having a gas inlet,
    a valve body which is held in the housing and arranged so as to be movable in a first and second axial direction,
    a valve seat,
    at least one first spring which acts on the valve body in the first axial direction,
    a shaft which is movable in the axial direction and indirectly or directly engages with the valve body,
    a drive which acts on the shaft and moves said shaft and thus the valve body in predefined longitudinal portions in the axial direction for opening and closing the gas regulation valve, wherein
    the gas regulation valve is formed in its entirety as a replaceable module, and
    the valve body is held by a membrane and a gas enters between the membrane and the valve seat in an axial direction, so that a gas pressure acts in the first axial direction against the membrane and in the second axial direction against the valve body.

2. The gas regulation valve according to claim 1, wherein at least a part of the housing is formed as an insert cartridge.

3. The gas regulation valve according to claim 1, wherein the drive is an electronically actuated stepper motor.

4. The gas regulation valve according to claim 1, wherein a non-gas-tight stepper motor is used.

5. The gas regulation valve according to claim 1, wherein a second spring is arranged between the shaft and the valve body and acts on the valve body in the second axial direction.

6. The gas regulation valve according to claim 1, wherein the valve body is hollow and a second spring is arranged within the valve body.

7. The gas regulation valve according to claim 1, wherein the valve seat is formed by parts of the housing of the gas regulation valve.

8. The gas regulation valve according to claim 3, wherein a sealing plate having a hole is provided between the stepper motor and the membrane, the shaft extending through the hole.

9. A gas regulation unit constructed in a modular manner, for regulating an amount of gas to be supplied to a gas burner, comprising a gas regulation valve formed as a module, according to claim 1, and at least one gas safety valve formed as a module.

10. The gas regulation unit according to claim 9, wherein the gas regulation valve formed as a module and the gas safety valve formed as a module are arranged in a row and the at least one gas safety valve is arranged upstream of the gas regulation valve when viewed in the gas flow direction.

11. The gas regulation unit according to claim 9, wherein the gas safety valve formed as a module has a housing, a valve body and at least one valve seat, the at least one valve seat being formed by parts of the housing.

12. The gas regulation unit according to claim 9, wherein only one gas safety valve is provided and this is formed as a double safety valve.

13. The gas regulation unit according to claim 9, wherein the gas regulation valve formed as a module and the gas safety valve formed as a module each have housing parts having means for releasably fastening to a gas valve housing, a ventilating fan housing or a manifold.

14. The gas regulation unit according to claim 13, wherein sealing means arranged in each case on an outside of the housing parts are provided for sealing the modules on the gas valve housing, the ventilating fan housing or the manifold.

15. A gas valve housing, ventilating fan housing or manifold, comprising a gas regulation unit according to claim 9.

16. A gas regulation valve comprising
    a housing having a gas inlet,
    a valve body which is held in the housing and arranged so as to be movable in a first and second axial direction,
    a valve seat,
    at least one first spring which acts on the valve body in the first axial direction,
    a shaft which is movable in the axial direction and indirectly or directly engages with the valve body,
    a drive which acts on the shaft and moves said shaft and thus the valve body in predefined longitudinal portions in the axial direction for opening and closing the gas regulation valve,
    a second spring arranged between the shaft and the valve body that acts on the valve body in the second axial direction, wherein
    the gas regulation valve is formed in its entirety as a replaceable module, and
    the valve body is hollow and the second spring is arranged within the valve body.

17. A gas regulation valve comprising
    a housing having a gas inlet,
    a valve body which is held in the housing and arranged so as to be movable in a first and second axial direction,
    a valve seat,
    at least one first spring which acts on the valve body in the first axial direction,
    a shaft which is movable in the axial direction and indirectly or directly engages with the valve body,
    a drive which acts on the shaft and moves said shaft and thus the valve body in predefined longitudinal portions in the axial direction for opening and closing the gas regulation valve, wherein
    the gas regulation valve is formed in its entirety as a replaceable module,
    the drive is an electronically actuated stepper motor,
    the valve body is held by a membrane and the gas enters between the membrane and the valve seat in an axial direction, and
    a sealing plate having a hole is provided between the electronically actuated stepper motor and the membrane, the shaft extending through the hole.

* * * * *